Figure 1:
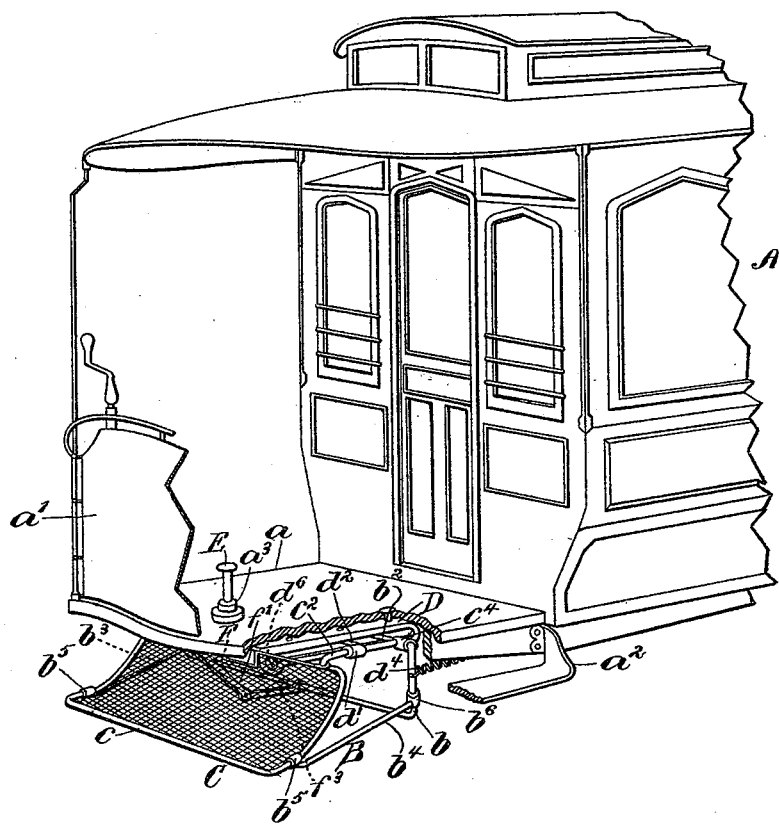

(No Model.)

2 Sheets—Sheet 1.

J. S. DETWILER.
CAR FENDER.

No. 544,404.

Patented Aug. 13, 1895.

(No Model.) 2 Sheets—Sheet 2.
J. S. DETWILER.
CAR FENDER.
No. 544,404. Patented Aug. 13, 1895.
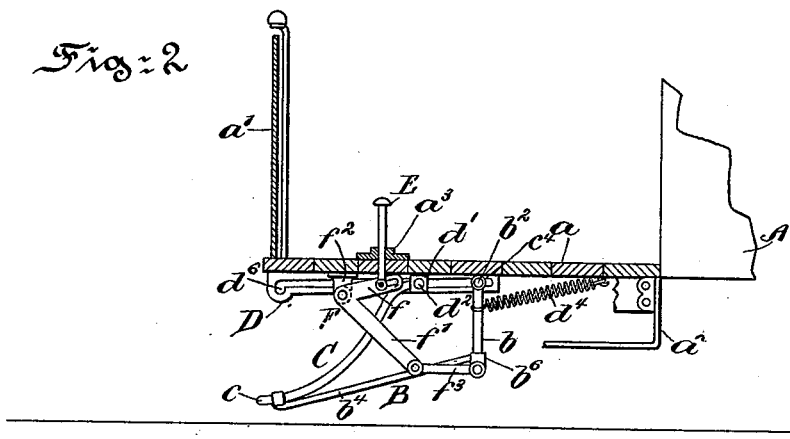
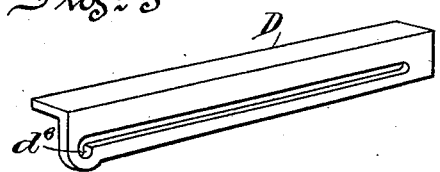
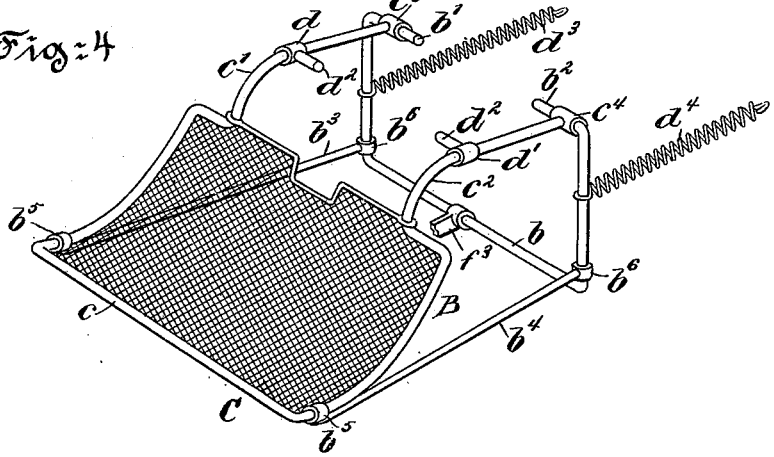
Witnesses:
Thomas M. Smith.
Richard C. Maxwell
Inventor,
John S. Detwiler,
By J. Walter Douglass
Attorney.

UNITED STATES PATENT OFFICE.

JOHN S. DETWILER, OF PHILADELPHIA, PENNSYLVANIA.

CAR-FENDER.

SPECIFICATION forming part of Letters Patent No. 544,404, dated August 13, 1895.

Application filed January 2, 1895. Serial No. 533,531. (No model.)

*To all whom it may concern:*

Be it known that I, JOHN S. DETWILER, a citizen of the United States, residing at the city of Philadelphia, in the county of Philadelphia and State of Pennsylvania, have invented certain new and useful Improvements in Car-Fenders, of which the following is a specification.

My invention has relation to fenders or life-guards for trolley and other railway-cars; and it relates more particularly to the general construction and arrangement of an appliance for such purpose.

The principal objects of my invention are, first, to provide a simple, durable, and effective fender or life-guard for a trolley or other railway-car, and, second, to provide a fender or life-guard adapted to normally occupy a position beneath the platform of the car and to be operated by foot-power to shift the fender or guard forward of the dashboard of the car and so as to become locked in such position with the person caught in the carrier or apron thereof and of being returned under the influence of springs upon the release of the foot-pressure to normal position beneath the platform of the car.

My invention, stated in general terms, consists of a car-fender or life-guard constructed and arranged in substantially the manner hereinafter described and claimed.

The nature and general features of my invention will be more fully understood from the following description, taken in connection with the accompanying drawings, forming part hereof, and in which—

Figure 1 is a perspective view of one end of a railway-car with a fender or life-guard embodying the characteristic features of my invention shown in application thereto, with the parts of the appliance in normal position beneath the platform of the car and also showing the foot-pressing lever for shifting the appliance forward and into a locked position beyond the dashboard of the car and so that the carrier or apron thereof may assume a position close to the road-bed. Fig. 2 is a vertical sectional view through the platform of the car and a side elevational view of the fender and its operating mechanism located on one side and also one of the inclined channeled slides or bearers secured to the bottom of the platform with its end socket for permitting of the locking of one of the pins, rods, or pintles of the carrier or apron therein and with the carrier or apron extended in operative position close to the ground. Fig. 3 is a perspective view of one of the channeled and socketed slides or bearers adapted to be secured to the under side of the platform, showing the construction and arrangement thereof; and Fig. 4 is a similar view of the carrier or apron and its framework and retracting spiral springs, the said appliance being shown detached from the car in order to illustrate the general construction and arrangement of the same and apart from the foot-operating mechanism thereof.

Referring to the drawings, A is a trolley or other motor-car of ordinary construction provided, as shown, with a front platform $a$, a dashboard $a'$, and side steps $a^2$, as clearly illustrated in Fig. 1 of the drawings.

B is the fender or life-guard, provided with a rear tubular frame $b$, having at the top projections $b'$ and $b^2$, extending inwardly from both sides and forming pintles or bearers, for a purpose to be presently fully explained.

$b^3$ and $b^4$ are tubular arms extending forward and having tubular end bearings $b^5$ and $b^6$ engaging the frame $b$ and surrounding frame $c$, of a carrier, apron, or scoop C, provided with rearwardly-extending slightly-arched arms $c'$ and $c^2$, having end tubular bearings $c^3$ and $c^4$ engaging the projections $b'$ and $b^2$ of the frame $b$. This carrier, apron, or scoop C may be composed of meshed wire or canvas and the surrounding frame $c$ thereof covered with rubber or other preferred material to serve as a means of protection to life and limb when an object or person is gathered into the carrier by affording the means which is adapted to prevent bruising or maiming of the caught object or person.

$d$ and $d'$ are tubular bearings rigidly mounted on the arched arms $c'$ and $c^2$ and provided with cross-rods, pintles, or pins $d^2$, as clearly illustrated in Fig. 4, for engaging oblong slotted slides, to be presently explained.

$d^3$ and $d^4$ are retracting spiral springs, connected at one of their ends with the frame $b$ and at their other ends with the bottom of the platform $a$ of the car, as clearly illustrated in Fig. 2 of the drawings.

D is a channeled or oblong slotted slide or bearer secured at each side to the bottom of the platform $a$ of the car A and provided with an end socket $d^6$, wherein engage the cross-rods, pintles, or pins $d^2$ of the fender-frame $b$, as hereinbefore explained, when the fender is caused to assume an extended position beyond the dashboard $a'$ of the car and close to the ground. The respective slides or bearers D are secured to the bottom of the platform of the car A, so as to assume a slightly-inclined position, in order that in the shifting forward of the fender or life-guard B, in a manner to be presently more fully described, the carrier or apron C thereof will be brought close to the ground, as hereinbefore explained. E is a foot-pressing lever extending through a step-like bearing $a^3$, secured to the platform $a$ and in movable engagement with a slotted arm $f$, of a bell-crank lever F, which is fulcrumed to a forked bearing $f^2$, secured to the under side of the platform $a$ of the car in any preferred manner. The other member $f'$ of the bell-crank lever F is pivotally connected by means of a link $f^3$ with the bottom cross-rod of the frame $b$, in order by the pressing against the foot-lever E the cross-rods, pintles, or pins of the frame $b$ of the appliance may be shifted in the channeled slides or bearers D on the bottom of the platform of the car, and the cross-rods, pintles, or pins $d^2$ on both sides thereby caused to engage in the sockets $d^6$ and held during the exerted pressure upon the lever E, with the carrier, apron, or scoop C extended beyond the dashboard $a'$ of the car A for picking up and carrying an object or person therein. Upon release of pressure against the foot-lever E by means of the springs $d^3$ and $d^4$ the respective cross-rods, pintles, or pins of the arms of the apron, scoop, or carrier-frame, as well as those of the frame $b$, are released in the one instance from the sockets $d^3$ and $d^4$, and in the other are caused to slide rearwardly in the oblong slotted or channeled slides or bearers D on both sides of the platform of the car A, and therewith the said carrier, apron, or scoop C is returned to normal position beneath the car in rear of the dashboard $a'$ of the platform thereof.

It will be manifestly obvious to those skilled in the art to which my invention appertains that as to minor details of the fender or life-guard modifications can be made without departing from the scope of my invention, and hence I do not wish to be understood as limiting myself to the precise construction and arrangement of all the parts of the appliance as illustrated; but,

Having thus described the nature and objects of my invention, what I claim as new, and desire to secure by Letters Patent, is—

1. The combination, with the platform of a car provided with slides or bearers, each having an oblong slot and end socket, of a fender provided with a frame with projecting cross-rods, pintles or pins engaging said slides or bearers, said fender having an inclined carrier-apron, retracting springs connected with said frame and with said platform of the car, a foot lever extending through said platform and connected with a bell crank lever pivotally supported from a bearing secured to said platform and linked to the rear of said fender frame, substantially as and for the purposes set forth.

2. The combination, with a car, of a fender comprising a tubular frame supporting in an inclined position a carrier-apron, said frame provided with cross-rods or pintles, oblong slotted slides or bearers with end sockets, retracting springs connected with said fender frame and with the platform of the car, a foot lever in movable engagement with a bell crank lever linked to said frame and said bell crank lever fulcrumed to a bearing on the under side of the platform of the car, substantially as and for the purposes set forth.

3. The combination, with a car provided with a platform having slotted slides or bearers secured to the under side thereof and with end sockets, of a fender provided with pintles or pins engaging the slots of said slides or bearers, retracting springs connected with the frame of said fender and with the platform of the car, a foot lever operating a bell crank fulcrumed to a support secured to said car, said bell crank lever linked to the rear frame of the fender, the construction and arrangement being such that by depressing said foot lever the fender-frame with its carrier-apron is shifted in advance of the platform and locked in its extended position in the sockets of said slides or bearers and upon the release of the pressure exerted against said foot lever by means of said retracting springs the fender-frame is returned to initial position in rear of the dash-board and beneath the platform of the car, substantially as described.

4. The combination, with a car, of a fender provided with a tubular frame and an inclined meshed wire carrier-apron, said frame provided with inwardly projecting cross-rods or pintles, slotted slides or bearers secured to the platform of the car and having sockets at one of their ends, the rods or pintles of said fender-frame engaging said slides and a bell crank mechanism connected with said frame and in movable engagement with a foot lever for shifting said fender from its normal position to a locked position with the fender extended close to the ground, substantially as and for the purposes described.

In testimony whereof I have hereunto set my signature in the presence of two subscribing witnesses.

JOHN S. DETWILER.

Witnesses:
THOMAS M. SMITH,
RICHARD C. MAXWELL.